United States Patent [19]

Reed et al.

[11] 4,191,813

[45] Mar. 4, 1980

[54] POLYMERIC ADSORBENTS FROM VINYLBENZYL CHLORIDE COPOLYMER BEADS

[75] Inventors: Samuel F. Reed, Holland; Robert K. Pinschmidt, Jr., Allentown, both of Pa.

[73] Assignee: Rohm and Haas Company, Philadelphia, Pa.

[21] Appl. No.: 927,226

[22] Filed: Jul. 24, 1978

[51] Int. Cl.$^2$ .................... B01J 1/22; C08F 212/36; C08F 212/10; C08J 3/24
[52] U.S. Cl. .................................... 521/31; 521/33; 525/330
[58] Field of Search .................. 521/31, 33; 526/17

[56] References Cited

U.S. PATENT DOCUMENTS

| | | | |
|---|---|---|---|
| 3,729,457 | 4/1973 | Davankov et al. | 521/37 |
| 3,822,244 | 7/1974 | Peyrot | 526/46 |
| 3,872,067 | 3/1975 | Harris | 521/31 |

*Primary Examiner*—Joseph L. Schofer
*Assistant Examiner*—Peter F. Kulkosky
*Attorney, Agent, or Firm*—Patrick C. Baker

[57] ABSTRACT

Polymeric adsorbents exhibiting improved adsorption are produced from lightly crosslinked vinylbenzyl chloride copolymer beads by post-crosslinking the copolymer beads while in a swollen state by contact with a Lewis acid catalyst such as a Friedel-Crafts catalyst or an acidic sulfonating agent. The adsorbents post-crosslinked with a Friedel-Crafts catalyst may be functionalized to ion exchange resins. Those adsorbents post-crosslinked with a sulfonating agent already are strong acid ion exchange resins.

26 Claims, No Drawings

POLYMERIC ADSORBENTS FROM VINYLBENZYL CHLORIDE COPOLYMER BEADS

BACKGROUND OF THE INVENTION

This invention relates to polymeric adsorbents and ion exchange resins of the macronet type, methods of preparing the adsorbents and resins, and uses of the adsorbents and resins for water-treatment, recovery of organic materials from gaseous and other streams, pharmaceutical purification and processing, catalysis, and other applications.

Adsorbents commonly are solids which exhibit selectivity at their surface for substances in a mixture, thereby providing a means of separating such substances from the mixture. The high surface area characteristic of adsorbents (usually well above 5 m.$^2$/g. of solid) normally results from a fine state of subdivision (non-porous adsorbents) or from pores in the adsorbent particles (porous adsorbents). Carbon black and $TiO_2$ and $ZnO$ pigments are examples of non-porous adsorbents. Granular carbon, silica gel, bone char, certain soils and asbestos are examples of well-known porous adsorbents obtained from naturally occurring materials. For separation or purification of complex substances (such as pharmaceuticals) synthetic adsorbents have been developed, some of which serve also as ion exchange materials or as intermediates for the manufacture of ion exchange materials. However, ion exchange is an absorption as well as an adsorption phenomenon, so that although all ion exchange materials are adsorbents, the converse is not necessarily true.

The synthetic adsorbents generally are porous polymeric solids, polystyrene and styrene-divinylbenzene copolymers being representative. Although it is possible to prepare synthetic polymers in a fine state of subdivision to obtain high surface area, fine particle size adsorbents cannot be used in cyclic processes, particularly processes involving columns, since the fine particles pack too tightly and impede flow. Adsorbents of moderately large particle size, of the order of about 0.02 mm. to 2 mm. diameter or greater, are therefore required. Polymeric beads, obtained by known suspension polymerization techniques, have a convenient particle size for use in columnar operations. Nevertheless, although the polymeric adsorbents can be made hydrophobic and the bead form enhances the usefulness of the polymeric adsorbents, their adsorbent properties have been too limited to enable the adsorbents to compete effectively with the carbonaceous adsorbents obtained from the pyrolysis of organic materials. However, the latter suffer from high moisture pickup in humid atmospheres, have poor reproducibility during manufacture, and have such fine pores and rigid structure as to crack, split and decrepitate under the high osmotic pressures commonly encountered in cyclic operations.

An object of the invention is to provide synthetic polymeric adsorbents and ion exchange resins which combine the best properties of known synthetic polymeric adsorbents and carbonaceous adsorbents but without the most serious deficiencies of either class. Accordingly, the adsorbents and ion exchange resins of the invention have moderate and uniform particle size (to permit use in columnar operations), are hydrophobic, have good physical stability (resistance to cracking and other forms destruction under osmotic pressure), have high surface area and/or high porosity, and sometimes exhibit high adsorption capacity without exceptionally high surface area and/or porosity. In this regard, even though certain of the adsorbents lack the extremely high surface areas of known polymeric adsorbents or activated carbon adsorbents, they equal the performance, or even outperform, such adsorbents, especially in their adsorption capacity for organic liquids at high concentration.

SUMMARY OF THE INVENTION

The adsorbents of the invention are polymeric materials in gel or macroreticular bead form and are produced by swelling a lightly crosslinked vinylbenzyl chloride polymer bead in an inert organic solvent, and then post-crosslinking by contacting the swollen polymer beads with a Lewis acid catalyst such as a Friedel-Crafts catalyst or an acidic sulfonating agent. The post-crosslinked polymer beads are thereby internally crosslinked as contrasted with external crosslinking resulting from the use of an external crosslinking agent. Typically, the adsorbents of the invention have surface areas in the range of about 100–1300 m$^2$/g. and porosities of at least 0.2 cc/cc, more usually 0.3–0.6.

The adsorbents are called "macronets" because the crosslinks are stable and have a long and rigid structure resulting from post-crosslinking lightly crosslinked polymer substrates while in a highly swollen state, the swollen state causing displacement of the polymer chains at significant distances from each other. When in accordance with certain embodiments of the invention the substrate polymer is macroreticular, further enhancement of adsorbent properties is often observed. The term "macronet" has been used to describe the ion exchange functionalized polystyrene and styrene-divinylbenzyl copolymer macromolecules obtained by crosslinking linear polystyrene in solution or styrene polymers in the swollen state by reaction with an alkylating agent under Friedel-Crafts conditions, as described in U.S. Pat. No. 3,729,457 and in related articles in *The Journal of Polymer Science*, Symposium No. 47, pages 95–101 and 189–195 (1974). Similar ion exchange resin products are disclosed in British Pat. No. 1,095,746 wherein polystyrene or a styrene derivative in a swollen pearl form undergoes crosslinking by acylation under Friedel-Crafts conditions. In these reactions, although a macronet product is obtainable, the absence of a polymer bead form makes the products uneconomical or gives products of inferior performance as compared with the macronet adsorbents and ion exchange resins of the present invention.

The term "macroreticular" as opposed to "microreticular" means porous adsorbents in which the pores are larger than atomic distances and are not part of the polymer structure per se. Rather, the pores are microscopic channels resulting from the squeezing out of an organic precipitant (extender) from a copolymer mass. As a consequence, the pore structure is not dependent upon environment and therefore is retained despite contact with various concentrations of electrolyte, solvent and exchangeable ions. In "microreticular" (gel-type) adsorbents the "pores" are not really pores at all because they are extremely small, usually below 15–20Å in diameter, and will disappear from the polymer structure when the polymer is dried. Because the pores of macroreticular resins are relatively large and are not greatly influenced by changes in environmental conditions, the macroreticular polymers are able to withstand large osmotic pressure variations commonly encountered in cyclic processes. Moreover, their moderately large particle size makes them especially useful in operations utilizing columns particularly in their ion exchange form, where the molecular weight of an ionic species to be exchanged is so high as to exclude use of gel-type ion exchange resins. Macroreticular polymers for ion exchange resin use are described in the technical literature, as in U.S. Pat. Nos. 3,037,052, 3,637,535 and 3,843,566.

DETAILED DESCRIPTION

The lightly crosslinked vinylbenzyl chloride copolymer beads used as substrates in forming the macronet adsorbents and ion exchange resins of the invention are either gel type or macroreticular type copolymers. Each of these polymer types is a well known material. The gel copolymers are essentially non-porous and are prepared in bead form by suspension polymerization of a monomer mixture containing a major amount of vinylbenzyl chloride or a polymerizable monoethylenically unsaturated aromatic monomer mixture of which a major proportion is vinylbenzyl chloride, and a minor crosslinking amount of a polyethylenically unsaturated monomer, either aliphatic or aromatic, containing a plurality of non-conjugated $CH_2=C>$ groups. The degree of crosslinking generally corresponds to the proportion of crosslinking monomer. For light crosslinking, sufficient of the crosslinking monomer will be used to give dimensional stability to the copolymer bead so that it will swell rather than dissolve in the subsequent swelling step. Suitable amounts of such monomers are 0.1 to about 20% by weight of the monomer mixture, preferably about 0.2% to about 8%, more preferably about 0.3% to about 2%. The lower crosslinking levels usually provide higher surface area and adsorption capacity in the final products but optimum performance will depend also upon the type of monomers and other conditions such as the degree of swelling and acid catalyst selected for the post-crosslinking, as well as upon other process conditions. Suitable monoethylenically unsaturated monomers for use with vinylbenzyl chloride indlude styrene, o-, m- and p-methyl styrenes, o-, m- and p-ethyl styrenes, various dialkyl strenes, ethylvinylbenzene, vinyl toluene, isopropenyl toluenes, vinyl naphthalene, vinyl anisole, and vinyl xylene, including any mixture thereof. Suitable polyethylenically unsaturated crosslinking agents include divinylbenzene, divinylpyridine, divinyltoluenes, divinylnaphthalenes, diallyl phthalate, ethylene glycol diacrylate, ethylene glycol dimethaceylate, trimethylolpropane trimethacrylate, neopentyl glycol dimethacrylate, bis-phenol A dimethacrylate, pentaerythritol tetra and trimethacrylates, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyll phosphate, N,N'-methylenediacrylaminde, N,N'methylene dimethacrylamide, N,N'-ethylenediacrylamide, trivinylbenzene, trivinylnaphthalene, polyvinylanthracenes and the polyallyl and polyvinyl ethers of glycol glycerol, pentaerythritol, resorcinol and the monothio or dithio derivatives of glycols. The preferred crosslinking monomers are the polyvinyl aromatic hydrocarbons such as divinylbenzene and trivinylbenzene.

Likewise, the macroreticular type copolymers are a well-known class of materials as exemplified in U.S. Pat. No. 3,843,566 noted above. Accordingly, only a brief description of these materials is necessary. In summary, the macroreticular substrate polymers are prepared from the same monomer mixtures as the gel-type copolymers, but a phase extender (sometimes called a precipitant) is utilized to provide the macroreticular form.

The macroreticular polymers are prepared most usually under suspension polymerization conditions utilizing a free radical catalyst and a liquid precipitant (phase extender) which acts as a solvent for the monomer mixture and which is present in such amount as to exert such small solvating action on the product crosslinked copolymer that phase separation of the product copolymer takes place. The precipitant is chemically inert under the polymerization conditions and its selection will be determined by the character of the monomers in the monomer mixture. When employing aromatic hydrocarbon monomers (such as up to 50% by weight styrene) with the vinylbenzyl chloride and divinylbenzene, the precipitant may be an alkanol containing 4–10 carbon atoms, such as methylisobutylcarbinol, or it may be a saturated aliphatic hydrocarbon containing at least 6 carbon atoms, such as heptane, isooctane, and cyclohexane. When suspension polymerization is the polymerization method used, the precipitant must be either immiscible or only partially miscible with the suspending medium.

The preferred macronet adsorbents of the invention are based on macroreticular copolymers of vinylbenzyl chloride, styrene and divinylbenzene (99.5–40% vinylbenzyl chloride, 0–50% styrene, balance divinylbenzene) and gel copolymers of vinylbenzyl chloride and divinylbenzene with or without styrene (1–4% by weight divinylbenzene, 0–50% styrene, balance vinylbenzyl chloride). In either case, the polymers may contain minor amounts of other monomers, such as about 1–4% by weight of acrylonitrile (as a viscoelasticity modifier).

Other monomer compositions from which the macroreticular copolymers may be formed are described in U.S. Pat. Nos. 3.275,548 and 3,357,158 and British Pat. Nos. 932,125 and 932,126 (incorporated by reference into U.S. Pat. No. 3,991,017), provided at least 40% by weight of the monomer mixture is vinylbenzyl chloride.

After formation of the copolymer substrate (or coincident therewith if the substrate is intended to be macroreticular and the precipitant is a swelling solvent), The copolymer is swollen in an inert organic solvent. A variety of solvents and solvent mixtures may be used for this purpose, including chlorinated hydrocarbons such as chlorobenzene, ethylene dichloride, perchloroethylene, propylene dichloride, and dichlorobenzene; aliphatic hydrocarbons, such as hexane, isooctane and petroleum ether; nitro paraffins such as nitro propane; nitro aromatics such as nitro benzene; and miscellaneous solvents such as carbon disulfide. Ethylene dichloride is the preferred solvent. The best products are those which swell at least 100%. While the copolymer is in the swollen state and is in the swelling solvent a Lewis acid catalyst is added and the mixture heated to about 40°–100° C. or higher (depending on the acid catalyst and the boiling point of the solvent) or reacted at room temperature for about 1-24 hours to effect the post-crosslinking. Other reaction temperatures and times may be used, depending upon the reactive species and catalyst in the reaction mixture. For example, whereas 40° to 85° C. is suitable for stannic chloride or aluminum chloride, −20° to 10° C. is effective for HF and 125° C. for H₂SO₄, all when used with ethylene dichloride swelling solvent. Following reaction, the reaction mixture is quenched with water or a lower alkanol such as methanol, or acetone, or by inverse aqueous quenching and the macronet polymer beads separated by thorough washing with suitable solvents and drying.

Friedel-Crafts acid catalysts appear to give the best products but useful macronet adsorbents are also prepared with other Lewis acids such as strong oxy acids such as perchloric acid, strong halogen acids such as hydrofluoric and HBF₄ acids, and acidic sulfonating agents of which sulfuric acid, oleum, sulfur trioxide, chlorosulfonic acid and fluorosulfonic acid are representative. The sulfonation not only crosslinks the copolymer to form a macronet adsorbent but also converts the copolymer to a sulfonic acid type cation exchange resin, thereby providing acidic ion exchange functionality as well as adsorbency.

Any Friedel-Crafts type catalyst also may be utilized to crosslink and thereby from the macronet adsorbents. These include the acidic metal halides, such as aluminum chloride, stannic chloride (preferred), aluminum bromide, boron fluoride, boron fluoride/ethylene oxide adduct, zinc chloride, ferric chloride, antimony chloride, titanium chloride, and the like. The swelling solvent and the solvent selected for the reaction medium, if an additional solvent is used, may be the same or different but should be solvents which will not deactivate the Friedel-Crafts catalyst. The swelling solvents set forth above have this character. From about 0.001% to about 5% by weight of Lewis acid (acid sulfonating agent or Friedel-Crafts catalyst) based on polymeric substrate will be effective, but the optimum amount of crosslinking catalyst will depend upon the reactants and conditions of the reaction.

While the precise structure of the macronets of the invention is not known, it is believed that the pendant chloromethyl groups of the vinylbenzyl chloride based, lightly crosslinked copolymer substrate react with the Lewis acid catalyst in the post-crosslinking step to form methylene crosslinks between the aromatic groups of the copolymer substrate:

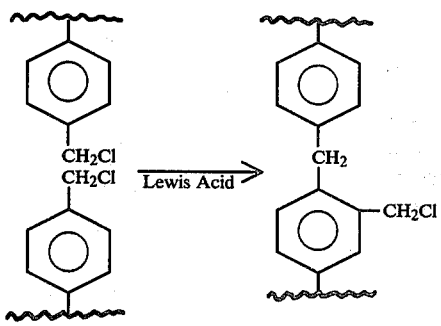

The reaction with the Friedel-Crafts or other type Lewis acid is essentially the same with respect to the crosslinked character of the adsorbents; however, some sulfonation of the copolymer substrate aromatic groups will occur when an acidic sulfonating crosslinker is used, thereby making these macronet adsorbents useful as cation exchange resins as well as adsorbents. In the latter case, it will be recognized that it the sulfonating agent is chlorosulfonic acid, the macronet adsorbent must first be hydrolyzed in the conventional manner (as by treatment with 4% aqueous sodium hydroxide—see U.S. Pat. No. 3,972,840). In any case the resulting macronet adsorbents contain residual chloromethyl groups, enabling the products to be easily converted to anion exchange resins or amphoteric ion exchange resins in the conventional manner.

The macronet adsorbents generally have a high crosslink density, for example about 3.5 crosslinks per phenyl group of copolymer substrate, and a uniform crosslink density due to use of the lightly crosslinked substrates which generally have evenly distributed crosslinks. In some cases the macronets have higher and more uniform crosslink density than lightly crosslinked styrene-divinylbenzene copolymer beads which have been swollen and formed into macronet adsorbents by treatment with aromatic crosslinking agents in the presence of Friedel-Crafts catalysts. Such external crosslinkers tend to diffuse non-uniformly through the copolymer network. Adsorbents of the invention have high surface area and show excellent gas phase adsorption capacities, especially for high concentrations of organic vapors. The adsorbents crosslinked with an acidic sulfonating agent, although not exhibiting surface areas as high as the Friedel-Crafts acid crosslinked adsorbents, have good cation exchange capacity and high activity for catalytic applications such as esterifications (U.S. Pat. No. 3,037,052).

If desired, those macronet adsorbents of the invention prepared with a Friedel-crafts catalyst may be converted to ion exchange resins by known techniques. For example, the adsorbents may be converted to weak base resins by aminolysis with dimethylamine, or to strong base resins by amination with trialkyl amines such as trimethylamine. It will be understood that the more highly post-crosslinked the macronets the less useful are they as intermediates for ion exchange resin formation. Functionalizing of polymeric adsorbents to form ion exchange resins is well-known and therefore requires no further elaboration. The patents listed above provided good description of ion exchange resin formation.

If formed from a macroreticular resin the macronet adsorbents may be used as substrates for the formation of hybrid copolymers and ion exchange resins in accordance with U.S. Pat. No. 3,991,017. Briefly, in forming such hybrid copolymers and ion exchange resins, a liquid monomer mixture containing a crosslinking monomer is added to an aqueous suspension of the macronet adsorbent, which liquid monomer mixture is imbibed into the pores of the macronet adsorbent and is polymerized therein. The resulting hybrid product may then be converted to an ion exchange resin by appropriate functionalization in the conventional manner. If the macronet adsorbent and/or the imbibed monomer mixture contains a carboxylic acid containing monomer, the resulting hybrid product may be converted to an amphoteric ion exchange resin by aminolysis and hydrolysis.

It is thus evident that a wide variety of adsorbents and ion exchange resins may be produced in accordance with the invention. By selection of monomers, swelling solvents and Lewis acid crosslinker, polymers can be obtained with high crosslinking density, high surface area, high porosity, fine pores, excellent physical stability and hydrophobicity. These properties make the product suitable for liquid and gas phase separations and various other adsorbent, catalytic and ion exchange applications. These include adsorption of organic materials such as phenol, carbon tetrachloride, hexane, cumene, and methyl chloroform, especially at high concentrations.

While the reasons for the exceptional adsorption capacities of the macronet polymer beads of the invention are not fully understood, it has been observed that the best adsorbents are prepared from copolymers which exhibit the highest swelling ratios in a given solvent. For example, those copolymer beads which swell to 6–10 times their dry volume in ethylene dichloride have adsorption capacities far exceeding those of conventional polymeric or carbon adsorbents with the same surface areas. A typical example is polymer beads prepared from vinylbenzyl chloride/divinylbenzene (50% active)/acrylonitrile copolymer, monomer ratio 96/1.0/2.0 which is phase extended to macroreticular form with 34.5% by volume (of the organic phase) with methyl isobutyl carbinol. When swollen in ethylene dichloride and reacted under Friedel-Crafts conditions with ferrous chloride, the macronet product beads have a surface area of 558 m.$^2$/g. but have adsorption capacity for hexane about 86% higher than that of a non-macronet polymer of similar composition (except for divinylbenzene in place of vinylbenzyl chloride) having a surface area of 750 m.$^2$/g. The highly swollen condition which is then made permanent by the post-crosslinking reaction, in combination with the already high porosity and/or large pores of the macroreticular substrate, provides the exceptional adsorptive behavior characteristic of the products of the invention.

The following examples further illustrate the invention. Unless otherwise indicated, all parts and percentages are by weight, the divinylbenzene is comercial quality, (about 50% active, balance essentially all ethylvinylbenzene), and the vinylbenzyl chloride predominates in a mixture of meta and para chloromethyl groups. The abbreviations have the following meanings:

DVB—divinylbenzene
S—styrene
VBC—vinylbenzyl chloride
AN—acrylonitrile
EDC—ethylene dichloride
MIBC—methylisobutyl carbinol
SA—surface area
MDC—methylene dichloride
NB—nitrobenzene
MR—macroreticular copolymer beads
EVB—ethylvinylbenzene In addition to their general utility as adsorbents, many of the mcaronet polymers of the invention exhibit molecular sieving properties. For example, the adsorbent of Example 10 shows a capacity of 0.79 ml./g. for hexane with a minimum molecular size of about 4 A, but a capacity of only 0.07 ml./g. for carbon tetrachloride with a minimum molecular size of about 6.2 A. By comparison most carbon and commercially available polymeric adsorbents show 0–50% greater capacity for hexane than for carbon tetrachloride. Accordingly, certain of the macronet adsorbents of the invention have utility for separations based on size.

EXAMPLE 1

To a 1 liter, 3-necked flask fitted with mechanical stirrer, reflux condenser connected to a water scrubber, thermometer, and heating mantel was charged 50 g. of macroreticular copolymer beads comprising VBC/DVB/AN, 97/1/2. The beads were swollen for 1.5 hours in excess EDC, the swelling being about 440% original dry volume. The mixture was then cooled to 0° C. and 85 g. stannic chloride (1 equivalent based on CH$_2$Cl groups) in excess ethylene dichloride was added slowly with stirring. The dark resin bead mass was allowed to warm to 25° C. overnight and then heated at reflux (83° C.) for 5 hours. On cooling, the reaction was quenched by dropwise addition of 250 ml. acetone. Excess solvent was then decanted and the resin beads were treated with a 1:1 mixture of actone and 1 N aqueous HCl, then with 1 N HCl. The product beads were then filtered, washed with water and methanol, and vacuum dried. The product was mainly whole, tan-colored, hydrophobic beads of SA=1200 m.$^2$/g., porosity=0.49 cc/cc, and residual Cl=3.36%. The beads exhibited adsorbent capacities of 1.23 g. CCl$_4$/g. at 30 torr, 0.60 g. hexane/g. at 40 torr and 680 mg./g cumene at 1900 ppm.

EXAMPLE 2

Essentially as described in Example 1, 50 g. of macroreticular copolymer beads (VBC/DVB/AN, 96/2/2) were swollen 200% in excess EDC and treated with 1 equivalent anhydrous AlCl$_3$ in EDC for 2 hours at 25° C. and 5 hours at 83° C. The product beads were then quenched in two portions, one half in acetone and one half with isopropanol. The rust colored beads had SA=764 m.$^2$/g., cumene capacity=500 mg./g. at 1600 ppm.

EXAMPLE 3

Essentially as described in Example 1, to 50 g. of gel copolymer beads (VBC/DVB, 95/5) swollen in excess EDC was added 1 equivalent of SnCl$_4$ at 0° C. The mixture was refluxed 5 hours and quenched to yield stable black beads having SA=422 m.$^2$/g. and a cumene capacity of 365 mg./g. at 1300 ppm.

EXAMPLE 4

This example illustrates the preparation of a high surface area strong acid resin via simultaneous sulfonation and crosslinking of a VBC resin. To 50 g. of macroreticular copolymer beads (VBC/DVB/AN, 97/1/2) swollen in excess EDC was added 300 g. of 99% H$_2$SO$_4$ with stirring. The reaction mixture was heated at 10° C. for 20 minutes and then 120° C. over a period of 3 hours, distilling off solvent as necessary. The mixture was then quenched at 120° C. with 70 ml of water during 1 hour cooled to 75° C. After decanting 70 ml of acid, the reaction mixture was reheated to 95° C. and 90 ml water was added over 45 minutes. The cooled reaction mixture was quenched finally be siphoning off 300 ml of water through the resin beads. After washing and drying, the resin beads had a surface area of 332 m.$^2$/g. and a cation exchange capacity of 2.37 meq/g.

EXAMPLES 5–19

Table I below summarizes the compositions, reaction conditions and product characteristics of Examples 1–4 as well as other adsorbents prepared substantially as described in Examples 1–4 with the changes indicated. Except where indicated the DVB in the polymer compositions is commercial DVB (which is about 50:50 DVB/EVB). Where no extender is indicated the copolymer beads are gels; otherwise, all of the copolymers are macroreticular resin beads. The extent of crosslinking of the substrate copolymers corresponds to the amount of crosslinking monomer. Thus, in Example 1, the copolymer is crosslinked to the extent of about 0.5% since the DVB crosslinker comprises 0.5% (50% of 1%) of the composition. The analyses indicate the extraordinary adsorbency of the products since surface areas and porosities greatly exceed the 5 m.$^2$/g. and 0.2 requirements for usefulness, respectively.

TABLE II-continued

| | | Phenol Adsorption | |
|---|---|---|---|
| Adsorbent | Capacity (g./l.) | Capacity Change (g./l.) | % Change |
| Ex. 2 | 95 | +15 | +19 |

TABLE I

| Ex. | Substrate Copolymer | Extender (% vol.) | Swelling Solvent | Cross-linking Catalyst | Reaction Conditions | | | Analysis | | |
|---|---|---|---|---|---|---|---|---|---|---|
| | | | | | Solvent | Temp (°C.) | Time (Hrs) | % Cl | SA (m$^2$/g) | Porosity cc/cc(dry) |
| 1 | VBC/DVB/AN 97/1/2 | MIBC(29) | EDC | SnCl$_4$ | EDC | 83 | 5 | 3.36 | 1200 | 0.487 |
| 2 | VBC/DVB/AN 96/2/2 | MIBC(24) | EDC | AlCl$_3$ | EDC | 83.5 | 5 | | 764 | 0.281 |
| 3 | VBC/DVB 95/5 | MIBC | EDC | SnCl$_4$ | EDC | | 5 | | 422 | |
| 4 | VBC/DVB/AN 96/2/2 | MIBC(29) | EDC | H$_2$SO$_4$ (99%) | EDC | 120 | 3 | | 332 | |
| 5 | VBC/DVB/AN 97/1/2 | MIBC(34) | EDC | H$_2$SO$_4$ (99%) | EDC | 120 | 3 | | 531 | |
| 6 | VBC/DVB 85.6/14.4 | MIBC(39) | EDC | AlCl$_3$ | EDC | 85 | 4 | 1.3 | 635 | 1.23 |
| 7 | VBC/DVB (54%) 90/10 | | EDC | AlCl$_3$ | EDC | 85 | 5 | | 495 | 0.41 |
| 8 | VBC/DVB (65%) 98/2 | | EDC | AlCl$_3$ | EDC | | | | 1032 | 0.429 |
| 9 | VBC/S/DVB/AN 50.68/55.62/1.78/1.92 | MIBC(24) | EDC | SnCl$_4$ | EDC | | | | 1043 | |
| 10 | VBC/DVB/AN 97/1/2 | MIBC(34) | EDC | FeCl$_3$ | EDC | 81 | 4 | | 558 | |
| 11 | VBC/DVB/AN 97/1/2 | MIBC(34) | EDC | BF$_3$·Et$_2$O | EDC | 81 | 4 | | 27.4 | |
| 12 | VBC/DVB/AN 97/1/2 | MIBC(34) | EDC | SnCl$_4$ | EDC | 81 | 5 | | 1048.5 | |
| 13 | VBC/DVB (65%) 98/2 | | EDC | SnCl$_4$ | EDC | Reflux | 5 | | 445 | |

| Ex. | Substrate | Extender | Swelling | Crosslinking | Reaction Conditions | | | Analysis | |
|---|---|---|---|---|---|---|---|---|---|
| | | | | | | | | | Porosity |
| 14 | VBC/DVB/AN 96/2/2 | MIBC(24) | EDC | SnCl$_4$ | EDC | | | 980 | 0.367 |
| 15 | VBC/S/DVB/AN 50.68/55.62/1.78/1.92 | MIBC | EDC | SnCl$_4$ | EDC | 81 | 4 | 30.1 | 0.1496 |
| 16 | VBC/DVB/AN 96/2/2 | MIBC(29) | EDC | SnCl$_4$ | EDC | 82 | 5 | 816 | |
| 17 | VBC/DVB 99/1 | MIBC(30) | EDC | AlCl$_3$ | EDC | 83 | 5 | 858 | 0.5340 |
| 18 | VBC/DVB/AN 97/1/2 | MIBC(34) | EDC | AlCl$_3$ | EDC | 82 | 5 | 1009 | |
| 19 | VBC/DVB/AN 97/1/2 | MIBC(34) | EDC | AlCl$_3$ | EDC | 50 | 5 | 828 | |

PERFORMANCE EVALUATIONS

The macronets of the invention (Table I above) were evaluated for adsorption of phenol, carbon tetrachloride/hexane, cumene, and methylchloroform. Table II reports columnar loading studies using solutions containing 6300 ppm phenol as compared with a commercially available S/DVB adsorbent not of the macronet type of the invention. It will be noted that the product of Example 2 exhibited nearly 20% improvement in capacity over the commercial adsorbent.

TABLE II

| | | Phenol Adsorption | |
|---|---|---|---|
| Adsorbent | Capacity (g./l.) | Capacity Change (g./l.) | % Change |
| Commercial S/DVB | 80 | — | — |

Certain of the macronet beads of the invention (Table I above) were also evaluated for CCl$_4$ and hexane vapor phase adsorption by determining weight gain of the resin samples subjected to an environment of an excess of either adsorbate in hexadecane in a closed container for 24 hours. Table III reports the results as wt.% CCl$_4$ or hexane adsorbed as compared with three brands of activated carbon and three types of commercially available S/DVB adsorbent resins not of the macronet type. It will be noted that the adsorbents of the invention were generally better than the carbon adsorbents.

TABLE III

| | CCl$_4$Hexane Adsorption | |
|---|---|---|
| Adsorbent | Wt. % CCl$_4$ | Wt. % Hexane |
| BPC Activated Carbon | 60–65 | 25 |
| Witco 517 | 60 | 28 |
| Activated Carbon | | |
| PCB Activated | 60 | — |

TABLE III-continued

| Adsorbent | CCl₄Hexane Adsorption | |
|---|---|---|
| | Wt. % CCl₄ | Wt. % Hexane |
| Carbon Commercial S/DVB | 56 | 28.1 |
| Example 1 | 123 | 60.5 |
| Example 8 | 81 | 44 |
| Example 9 | 108 | 53.8 |
| Example 10 | 11.6 | 52.1 |

Table IV reports column loading for cumene and methylchloroform in the vapor phase as compared with a commercially available S/DVB non-macronet type adsorbent. It will be noted that the Example 2 sample adsorbed cumene more than 90%. Methylchloroform (MCF) capacities of the samples tested also exceeded the methylchloroform capacities of the commercial S/DVB, especially at high adsorbate concentration ($C_o$=369,500 ppm).

TABLE IV

| Adsorbent Example | Sample wt. (g.) | | $C_o$(ppm)[1] | | Ceq. (ppm)[2] | | Capacity (mg./g.) | |
|---|---|---|---|---|---|---|---|---|
| | MCF | Cumene | MCF | Cumene | MCF | cumene | MCF | cumene |
| 1 | 0.5008 | | 23100 | | 115 | | 65 | |
| Commercial S/DVB | — | | 23100 | | 110 | | 30 | |
| 2 | | 5.0017 | | 1353600 | | 290 | | 330 |
| Commercial S/DVB | | — | | 703870 | | 500 | | 220 |
| 12 | 3.0001 | | 369500 | | 990 | | 175 | |
| Commercial S/DVB | — | | 369500 | | 2000 | | 100 | |

[1]Initial concentration of adsorbate
[2]Concentration of adsorbate at equilibrium after treatment with adsorbent.

We claim:

1. A polymeric adsorbent comprising lightly crosslinked copolymer beads of the macronet type, containing at least 40% by weight of vinylbenzyl chloride, the balance of monomers in said copolymer beads, if any, comprising a major proportion of aromatic monomers, said lightly crosslinked copolymer beads being postcrosslinked in a swollen state with a Lewis acid catalyst.

2. The adsorbent of claim 1 wherein vinylbenzyl chloride comprises up to 99.5% by weight of the lightly crosslinked copolymer beads.

3. The adsorbent of claim 1 where the lightly crosslinked copolymer is a copolymer of vinylbenzyl chloride, styrene and divinylbenzene.

4. The adsorbent of claim 1 where the lightly crosslinked copolymer is a copolymer of vinylbenzyl chloride and divinylbenzene.

5. The adsorbent of claim 1 where the lightly crosslinked copolymer is a copolymer of vinylbenzyl chloride, acrylonitrile and divinylbenzene.

6. The adsorbent of claim 1 where the lightly crosslinked copolymer is a copolymer of vinylbenzyl chloride, styrene, acrylonitrile and divinylbenzene.

7. The adsorbent of claim 1 where the lightly crosslinked copolymer is in gel form.

8. The adsorbent of claim 1 wherein the lightly crosslinked copolymer is in macroreticular form.

9. The adsorbent of claim 1 wherein the Lewis acid is selected from a Friedel-Crafts catalyst and an acidic sulfonating agent.

10. The adsorbent of claim 1 wherein the Lewis acid is sulfuric acid.

11. The adsorbent of claim 1 wherein the lightly crosslinked copolymer beads are about 0.1–20% by weight crosslinking.

12. The adsorbent of claim 1 wherein the lightly crosslinked copolymer comprises at least 40% by weight vinylbenzyl chloride, about 0.3–8% by weight divinylbenzene, and the balance styrene, and the Lewis acid is a Friedel-Crafts catalyst.

13. The adsorbent of claim 1 wherein the lightly crosslinked copolymer comprises at least 40% by weight vinylbenzyl chloride, about 0.3–8% by weight divinylbenzene and the balance styrene, and the Lewis acid is sulfuric acid.

14. A method of producing a polymeric adsorbent of the macronet type, which comprises swelling lightly crosslinked copolymer beads containing at least 40% by weight of vinylbenzyl chloride the balance of monomers in said copolymer beads, if any, comprising a major proportion of aromatic monomers, in an organic solvent and crosslinking the swollen beads by reactively contacting the beads with a Lewis acid catalyst.

15. A method of claim 14 wherein the copolymer is a copolymer of vinylbenzyl chloride, divinylbenzene and at least one other monoethylenically unsaturated monomer.

16. The method of claim 15 wherein said other monomer is styrene.

17. The method of claim 15 wherein said other monomers are styrene and acrylonitrile.

18. The method of claim 14 wherein the organic solvent is selected from halogenated hydrocarbons, aliphatic hydrocarbons, carbon disulphide, nitroparaffins, nitroaromatics, or any mixture thereof.

19. The method of claim 14 wherein the Lewis acid catalyst is a Friedel-Crafts catalyst.

20. The method of claim 14 wherein the Lewis acid catalyst is sulfuric acid.

21. The method of claim 14 wherein the organic solvent is ethylene dichloride.

22. An ion exchange resin comprising a functionalized adsorbent of claim 1.

23. An ion exchange resin comprising a functionalized adsorbent of claim 2.

24. An ion exchange resin comprising a functionalized adsorbent of claim 3.

25. An ion exchange resin comprising a functionalized adsorbent of claim 4.

26. An ion exchange resin comprising a functionalized adsorbent of claim 8.

UNITED STATES PATENT AND TRADEMARK OFFICE
CERTIFICATE OF CORRECTION

PATENT NO. : 4,191,813

DATED : March 4, 1980

INVENTOR(S) : Samuel F. Reed and Robert K. Pinschmidt, Jr.

It is certified that error appears in the above—identified patent and that said Letters Patent is hereby corrected as shown below:

Col. 1, line 66 - Between the words "forms" and "destruction" insert the word --of--.

Col. 3, line 25 - Symbol greater than (>) should be less than (<).

Col. 3, line 43 - Word "indlude" should be --include--.

Col. 3, line 45 - Word "strenes" should be --styrenes--.

Col. 3, line 51 - Word "dimethaceylate" should be --dimethacrylate--.

Col. 5, line 24 - Change the word "from" to --form--.

Col. 5, line 68 - Word "it" should be --if--.

Col. 6, line 42 - Word "provided" should be --provide--.

Col. 7, line 52 - Word "mcaronet" should be --macronet--.

Col. 12, line 12 - Delete the word "crosslinking" and insert --crosslinked prior to said post-crosslinking--.

Signed and Sealed this

Seventeenth Day of January 1984

[SEAL]

Attest:

GERALD J. MOSSINGHOFF

Attesting Officer

Commissioner of Patents and Trademarks